United States Patent
Sheaf et al.

(10) Patent No.: US 8,967,964 B2
(45) Date of Patent: *Mar. 3, 2015

(54) BOUNDARY LAYER ENERGISER

(75) Inventors: Christopher T. J. Sheaf, Derby (GB); Zahid M. Hussain, Derby (GB)

(73) Assignee: Rolls-Royce PLC, London (GB)

( * ) Notice: Subject to any disclaimer, the term of this patent is extended or adjusted under 35 U.S.C. 154(b) by 951 days.

This patent is subject to a terminal disclaimer.

(21) Appl. No.: 12/883,553

(22) Filed: Sep. 16, 2010

(65) Prior Publication Data

US 2011/0103969 A1 May 5, 2011

(30) Foreign Application Priority Data

Nov. 2, 2009 (GB) .................................. 0919107.3

(51) Int. Cl.
*F01D 5/18* (2006.01)
*F02K 3/04* (2006.01)
(Continued)

(52) U.S. Cl.
CPC . *F02K 3/04* (2013.01); *B64C 11/48* (2013.01); *B64C 21/04* (2013.01); *B64C 21/08* (2013.01); *B64D 29/04* (2013.01); *B64D 2027/026* (2013.01); *B64D 2033/0226* (2013.01); *F02K 1/34* (2013.01); *F05D 2240/121* (2013.01); *F05D 2240/122* (2013.01); *F05D 2240/303* (2013.01); *F05D 2240/304* (2013.01); *F05D 2270/17* (2013.01); *Y02T 50/166* (2013.01); *Y02T 50/66* (2013.01); *F05D 2250/131* (2013.01); *F05D 2240/14* (2013.01); *F05D 2240/127* (2013.01); *F05D 2250/132* (2013.01);
(Continued)

(58) Field of Classification Search
CPC ....... F01D 5/145; F04D 29/68; F04D 29/684; F05D 2270/17; F05D 2270/173; F05B 2270/1081; B64C 21/00; B64C 21/04; B64C 21/02; F15D 1/12
USPC .......... 415/914, 144, 145, 119; 416/93 R, 94, 416/1; 60/226.1, 226.2, 226.3; 137/15.1, 137/15.2; 244/53 B
See application file for complete search history.

(56) References Cited

U.S. PATENT DOCUMENTS

| 2,041,793 A | 5/1936 | Stalker |
| 2,248,308 A | 7/1941 | Rice |

(Continued)

FOREIGN PATENT DOCUMENTS

| EP | 0 439 923 A1 | 8/1991 |
| EP | 0 940 338 A2 | 9/1999 |

(Continued)

OTHER PUBLICATIONS

Jun. 8, 2012 Office Action issued in U.S. Appl. No. 12/883,566.
(Continued)

*Primary Examiner* — Dwayne J White
*Assistant Examiner* — Adam W Brown
(74) *Attorney, Agent, or Firm* — Oliff PLC

(57) ABSTRACT

A boundary layer energizer (20) for energizing a boundary layer flow over a surface (22), the boundary layer energizer (20) comprising a plurality of passages (24), each passage terminating in a respective hole (26) provided on the surface (22), the holes being arranged in a cluster (23) on the surface, wherein the plurality of passages are angled with respect to one another at the surface such that, when in use, a vortex (24) is formed by a fluid flowing through the plurality of passages.

18 Claims, 9 Drawing Sheets

(51) Int. Cl.
  *B64C 11/48* (2006.01)
  *B64C 21/04* (2006.01)
  *B64C 21/08* (2006.01)
  *B64D 29/04* (2006.01)
  *F02K 1/34* (2006.01)
  *F01D 5/14* (2006.01)
  *B64D 27/02* (2006.01)
  *B64D 33/02* (2006.01)

(52) U.S. Cl.
  CPC ......... *F05D 2260/96* (2013.01); *B64C 2230/06* (2013.01); *B64C 2230/04* (2013.01); *F01D 5/145* (2013.01); *Y02T 50/673* (2013.01); *Y10S 415/914* (2013.01)
  USPC .............................. 416/1; 415/914; 416/93 R

(56) References Cited

U.S. PATENT DOCUMENTS

| | | | |
|---|---|---|---|
| 2,565,720 | A | 8/1951 | Collison et al. |
| 2,650,781 | A | 9/1953 | Taylor |
| 2,836,463 | A | 5/1958 | Wilson |
| 3,421,577 | A | 1/1969 | Valyi |
| 3,508,561 | A | 4/1970 | Cornish, III |
| 3,525,486 | A | 8/1970 | Wimpenny |
| 3,556,444 | A | 1/1971 | Kopp |
| 3,776,363 | A | 12/1973 | Kuethe |
| 4,163,366 | A | 8/1979 | Kent |
| 4,478,380 | A | 10/1984 | Frakes |
| 4,529,358 | A | 7/1985 | Papell |
| 4,749,150 | A | 6/1988 | Rose et al. |
| 4,955,565 | A | 9/1990 | Coplin |
| 5,080,303 | A | 1/1992 | Hutton |
| 5,104,069 | A | 4/1992 | Reising |
| 5,148,989 | A | 9/1992 | Skinner |
| 5,552,576 | A | 9/1996 | Giamati |
| 5,655,732 | A | 8/1997 | Frank |
| 5,778,676 | A | 7/1998 | Joshi et al. |
| 5,803,409 | A | 9/1998 | Keefe |
| 5,988,522 | A * | 11/1999 | Glezer et al. ................... 239/11 |
| 6,116,015 | A | 9/2000 | Taylor et al. |
| 6,425,554 | B1 | 7/2002 | Moreland |
| 6,837,465 | B2 | 1/2005 | Lisy et al. |
| 7,111,809 | B1 | 9/2006 | Tai et al. |
| 7,143,983 | B2 | 12/2006 | McClure |
| 7,510,149 | B2 * | 3/2009 | Miller et al. ................... 244/207 |
| 7,597,288 | B2 | 10/2009 | Kwok et al. |
| 7,832,689 | B2 | 11/2010 | Prince et al. |
| 8,038,102 | B2 | 10/2011 | Miller et al. |
| 8,348,199 | B2 * | 1/2013 | Sheaf et al. ................ 244/200.1 |
| 2005/0147497 | A1 | 7/2005 | Doerffer et al. |
| 2006/0078417 | A1* | 4/2006 | Benton ....................... 415/115 |
| 2006/0249628 | A1 | 11/2006 | Turner et al. |
| 2007/0227153 | A1 | 10/2007 | Truax |
| 2008/0149205 | A1 | 6/2008 | Gupta et al. |
| 2010/0293917 | A1 | 11/2010 | Handley et al. |

FOREIGN PATENT DOCUMENTS

| | | |
|---|---|---|
| EP | 2 065 303 A2 | 6/2009 |
| GB | 2 446 147 A | 8/2008 |
| WO | WO 2008045074 A1 * | 4/2008 |
| WO | WO 2009/025549 A1 | 2/2009 |

OTHER PUBLICATIONS

Search Report issued in British Patent Application No. 0919110.7, on Feb. 17, 2010.
Search Report issued in British Patent Application No. 0919107.3, on Feb. 17, 2010.
Search Report issued in British Patent Application No. 0919115.6, on Feb. 15, 2010.
Search Report issued in British Patent Application No. 0908540.8, on Sep. 7, 2009.
Search Report issued in British Patent Application No. 0919118.0, on Feb. 15, 2010.
U.S. Appl. No. 12/883,566 in the name of Christopher T.J. Sheaf, filed Sep. 16, 2010.
U.S. Appl. No. 12/767,989 in the name of Christopher T.J. Sheaf, filed Apr. 27, 2010.
U.S. Appl. No. 12/883,400 in the name of Christopher T.J. Sheaf, filed Sep. 16, 2010.
Jun. 20, 2013 Office Action issued in U.S. Appl. No. 12/883,400.
Search Report issued in corresponding European Application No. 10 16 1151.5 dated Mar. 4, 2011.
Apr. 3, 2014 European Search Report issued in European Patent Application No. EP 10 17 7121.

* cited by examiner

BOUNDARY LAYER ENERGISER

This invention relates to a vortex generator and particularly but not exclusively relates to a boundary layer energiser for energising a boundary layer flow over a surface.

BACKGROUND

Typically, active flow control involves injecting an energetic flow into a boundary layer to increase the momentum of the boundary layer flow thereby delaying separation of the boundary layer from the surface. In particular, active flow control on the intake lips of a jet engine has been proposed previously.

It has been suggested previously that active flow control could be provided by the use of perforations on the intake surface. A flow may be introduced through these perforations to re-energise the intake near wall boundary layer. These perforations may take the form of holes either perpendicular to the surface contour or angled in a uniform orientation. However, as shown in FIG. 1 such perforations produce plumes 10 which project into the mainstream flow 12 and generate a relatively weak horseshoe vortex 14 at the base, which is used to re-energise the boundary layer downstream. With this arrangement a high flow of air is required in order to re-energise the boundary layer sufficiently and this reduces the efficiency and performance of the engine. The source of this problem is that it takes a lot of power/energy to create the plumes, which in turn create relatively low powered horseshoe vortices that re-energise the boundary layer. Thus the previously-proposed mechanism generates high-powered jets and low powered vortices, but it is the vortices that do the useful work.

By contrast, U.S. Pat. No. 4,749,150 discloses a "Turbofan duct with noise suppression and boundary layer control" and describes the use of suction through the acoustic liner of an engine intake for boundary layer control. However, this invention also uses a lot of power to suck sufficient air from the boundary layer. Furthermore, it is also subject to blockage with debris such as dust and insects. For these reasons blowing, as opposed to suction, is preferred.

The present invention therefore seeks to address these issues.

STATEMENTS OF INVENTION

According to a first aspect of the present invention there is provided a boundary layer energiser for energising a boundary layer flow over a surface, the boundary layer energiser comprising a plurality of passages, each passage terminating in a respective hole provided on the surface, the holes being arranged in a cluster on the surface, wherein the plurality of passages are angled with respect to one another at the surface is such that, when in use, a vortex is formed by a fluid flowing through the plurality of passages.

The vortex may be a helical vortex. The cluster of holes may comprise two holes. Alternatively, the cluster of holes may comprise three or more holes and the holes may be arranged on the surface such that each hole may be at the vertex of a first polygon. The first polygon may comprise between three and ten vertices. The first polygon may be a regular polygon and may be a triangle, square, pentagon, hexagon etc.

The boundary layer energiser may comprise a plurality of clusters, each with a plurality of passages and respective holes arranged on the surface. A centre of each cluster may be arranged on the surface at the vertex of a second polygon. The second polygon may comprise one of a triangle, square, pentagon, hexagon etc. The second polygon may be a regular polygon. The second polygon may comprise an even number of vertices.

The boundary layer energiser may comprise a plurality of clusters, each with a plurality of passages and respective holes arranged on the surface, wherein a centre of each cluster may be arranged on the surface in a linear arrangement. The passages may be arranged such that neighbouring clusters generate a vortex in opposite directions.

The direction of each passage at the surface may have a vector component parallel to the surface. The vector defined by the sum of the directions of the plurality of passages at the surface may be perpendicular to the surface. The vector defined by the sum of the directions of the plurality of passages at the surface may have a component parallel to the surface.

The flow may be provided by a flow source. The flow may be provided from an opening in a second surface.

A turbomachine may comprise a boundary layer energiser as described above. A gas turbine may comprise a boundary layer energiser as described above.

According to a second aspect of the present invention there is provided a boundary layer energiser for energising a boundary layer flow over a surface, the boundary layer energiser comprising one or more passages terminating in one or more respective holes provided on the surface, wherein the one or more passages are configured such that, when in use, a fluid emanating from the one or more passages flows in a vortex.

According to a third aspect of the present invention there is provided a method of energising a boundary layer flowing over a surface, the method comprising: providing a plurality of passages, each passage terminating in a respective hole provided on the surface, the holes being arranged in a cluster on the surface, wherein the plurality of passages are angled with respect to one another at the surface; allowing a fluid to flow through the plurality of passages; and forming a helical vortex with the fluid by virtue of the angles between the passages.

According to a fourth aspect of the present invention there is provided a method of energising a boundary layer flowing over a surface, the method comprising: providing one or more passages terminating in one or more respective holes provided on the surface; allowing a fluid to flow through the plurality of passages; and forming a vortex with the fluid by virtue of the one or more passages which are configured such that the fluid emanating from the one or more passages flows in a vortex.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
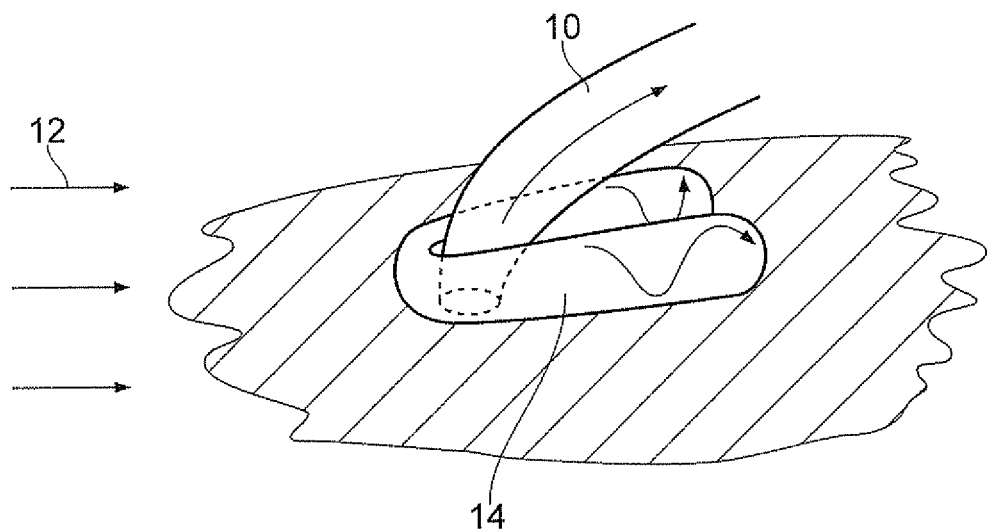
FIG. 1 shows a previously proposed boundary layer re-energiser.
Figure 2A:
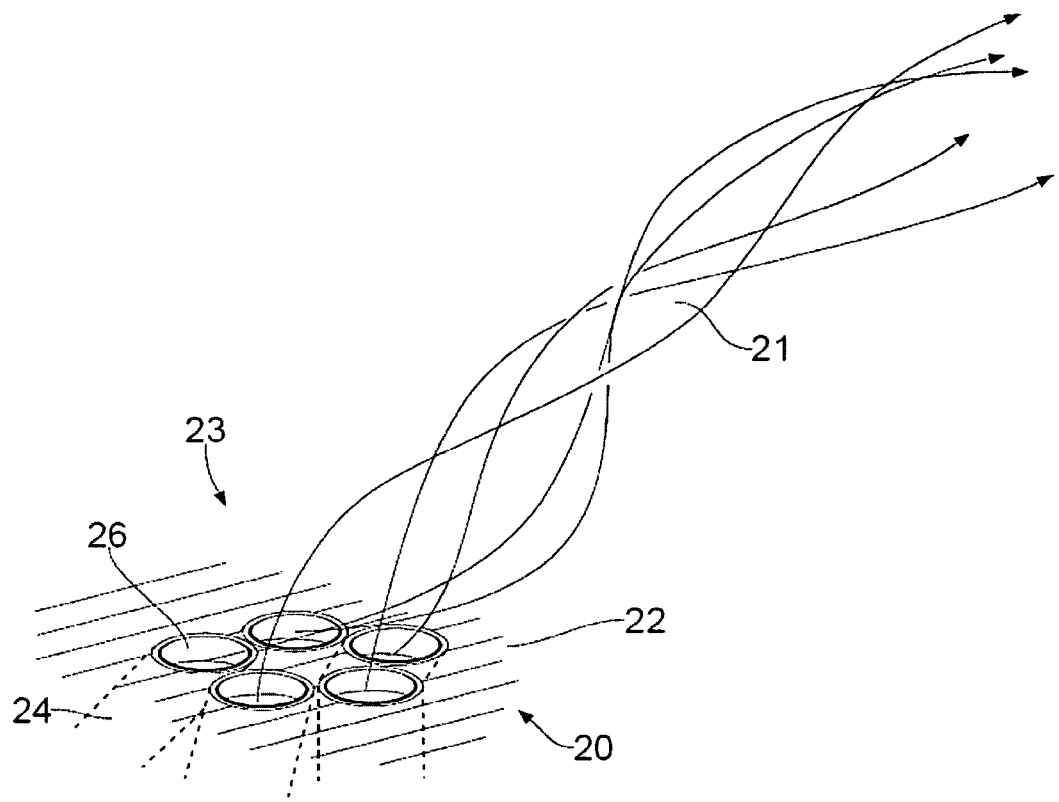
FIGS. 2a and 2b shows a boundary layer energiser according to an example of the present invention.

With reference to FIG. 2a, a boundary layer energiser 20 according to an embodiment of the present invention, energises a boundary layer flowing over a surface 22. The boundary layer energiser comprises one or more passages 24 and each passage 24 terminates in a respective hole 26 provided on the surface 22. The holes 26 are arranged in a cluster 23 on the surface 22 and the plurality of passages 24 are angled with respect to one another at the surface 22 such that a helical vortex 21 is formed by a fluid flowing through the plurality of passages 24. The flow provided to each of the passages 24 is provided by a flow source (not shown). The boundary layer energiser 20 may comprise a single cluster 23 or may comprise a plurality of clusters.

Each cluster 23 may comprise between 2 and 10 passages and respective holes. In the case of the cluster of holes comprising three or more holes, the holes may be arranged on the surface such that each hole is at the vertex of a first polygon comprising between three and ten vertices. In the particular embodiment shown in FIG. 2a, five passages 24 are provided and these passages are arranged at the vertices of a pentagon on the surface 22.

Figure 2B:
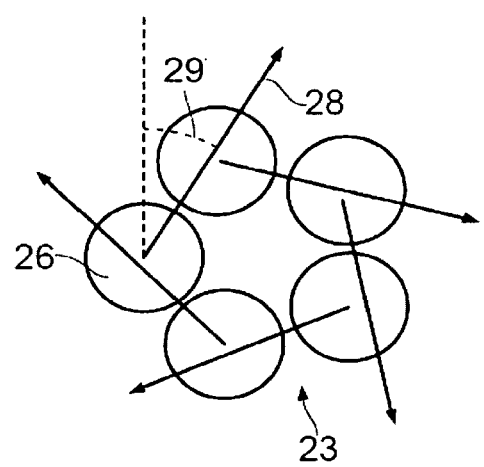

With reference to FIG. 2b, each passage 24 has a direction 28 with a vector component at the surface 22 which is parallel to the surface. In other words, the flow leaving each passage 24 is not purely perpendicular to the surface 22, but has a component which is parallel to the surface. Furthermore, each successive passage 24 directs flow in a direction with a bearing angle 29 which, when viewed in the plane of the surface, increases (or decreases) from passage to passage. In this way, the cluster 23 of holes 26 are arranged about a point and the passage vectors define a polygon on the surface (except for the case where there are two holes). Accordingly, the arrangement of the passages and holes causes the flow leaving the passages to create a helical vortex, either in a clockwise or anticlockwise direction.

The vector defined by the sum of the direction vectors 28 of the plurality of passages 24 at the surface 22 may be perpendicular to the surface. In other words the net flow and the vortex 21 emanating from the plurality of passages may be perpendicular to the surface. Alternatively, the vector defined by the sum of the direction vectors 28 of the plurality of passages at the surface may have a component parallel to the surface 22.

In other words the vortex generated by the plurality of passages and holes may, in the absence of a mainstream flow, either be perpendicular to the surface or have a component parallel to the surface.

Figure 3:
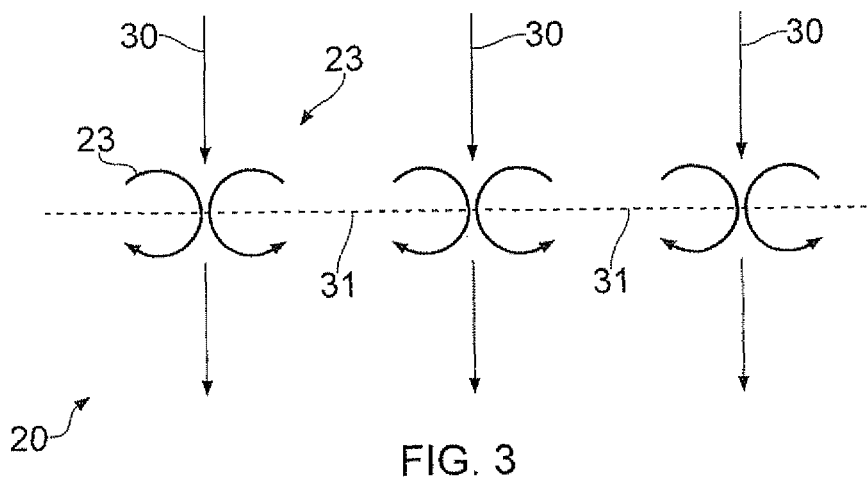
FIG. 3 shows a plurality of boundary layer energisers according to an example of the present invention in a first arrangement.
Figure 4:
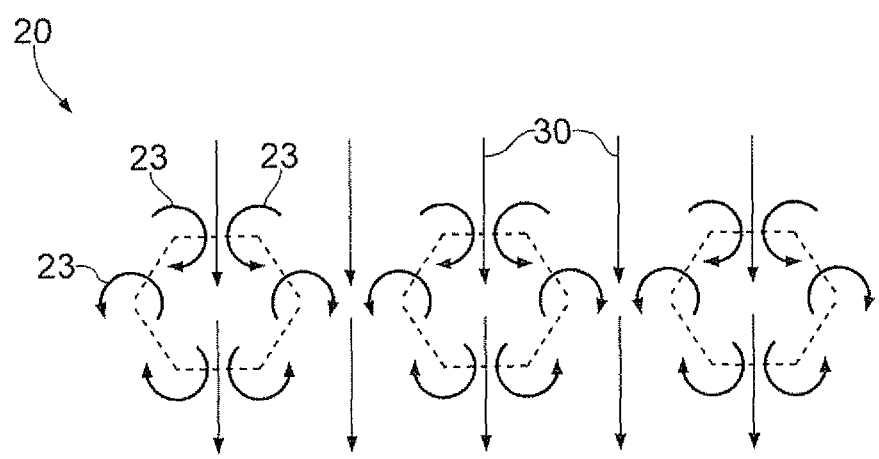
FIG. 4 shows a plurality of boundary layer energisers according to an example of the present invention in a second arrangement.

With reference to FIGS. 3 and 4, the boundary layer energiser 20 may comprise a plurality of clusters 23, which may, for example, be arranged in a linear pattern (FIG. 3) or a hexagonal pattern (FIG. 4). In either case it is desirable that neighbouring clusters 23 generate vortices that rotate in opposite directions. As is shown in FIG. 4, a plurality of hexagonal patterns may be provided, and these may in turn be arranged in a line. The linear arrangement of clusters or the linear arrangement of hexagonal patterns of clusters may be disposed so that the linear arrangement is substantially perpendicular to the direction of the mainstream flow 30.

With the linear arrangement of individual clusters (as shown in FIG. 3), a gap 31 is preferably provided between neighbouring clusters where the tendency of the counter rotating neighbouring clusters is to generate a flow opposing the mainstream flow. The gap allows the mainstream flow to flow between these neighbouring clusters. Such a gap is not however required between neighbouring clusters where the tendency of the counter rotating clusters is to generate a flow in the direction of the mainstream flow.

Figure 5:
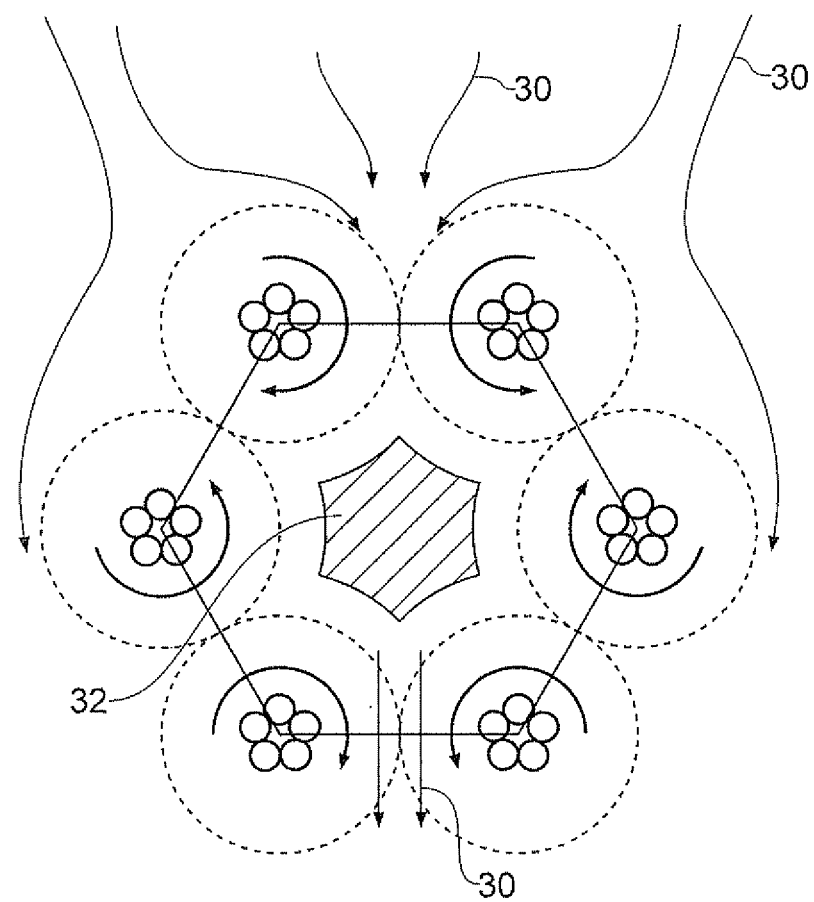
FIG. 5 shows further detail of the boundary layer energisers in the second arrangement.

With reference to FIG. 5, the boundary layer energiser 20 may be arranged in patterns to produce meshed geared vortices. (FIG. 5 corresponds to one of the hexagonal patterns shown in FIG. 4). A space 32 is provided in the centre of the pattern of clusters to allow the mainstream flow 30 through. Any shape with clusters disposed at the vertices may be used, however an even number of vertices would ensure neighbouring clusters 23 generate vortices that rotate in opposite directions. With such an arrangement the vortices reinforce rather than act against each other. This allows the vortices to persist in the mainstream flow rather than dying out. The vortices therefore require a lower energy flow to drive them. Thus, for a given driving pressure, the boundary layer energisers of the present invention generate stronger and more persistent vortices than conventional holes, which generate the horseshoe type vortices described above.

Figure 6:
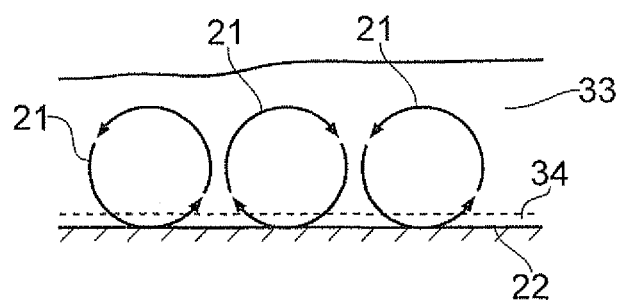
FIG. 6 shows a view of a boundary layer flow looking in a stream-wise direction and downstream of a boundary layer energiser according to an example of the present invention.

With reference to FIG. 6, the boundary layer flow 33 near the surface wall 22 contains low energy air which tends to separate easily from the surface causing a flow breakdown. In the specific example of a jet engine intake, such a flow separation prevents the intake from working effectively. The boundary layer energiser 20 acts to re-energise the boundary layer and assists in driving the boundary layer along the surface, thereby preventing it from separating. The boundary layer energisers 20 start out with the axes of the vortices substantially normal to the surface 22, but the vortices are soon turned by interaction with the mainstream flow 30 to a substantially axial direction (tangential to the surface). The powerful helical vortices produced by multiple clusters introduce powerful stirring of the near wall boundary layer 34 allowing fluid (e.g. air) to be drawn from the mainstream flow towards the surface and vice versa, thereby reenergising the boundary layer with the mainstream flow.

Figure 7:
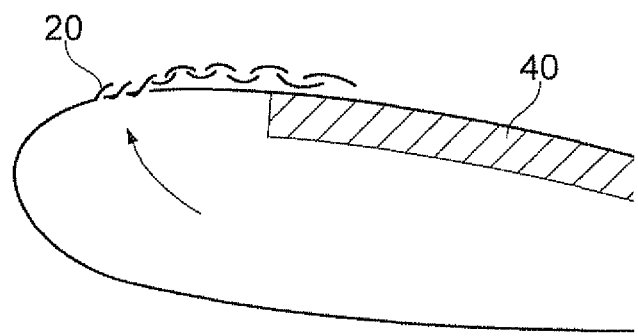
FIG. 7 shows a first example application for a boundary layer energiser according to an example of the present invention.

With reference to FIG. 7, the flow (for example air) being ejected from the boundary layer energiser 20 may be hot (i.e. for anti-icing purposes). The stirring mechanism described above will promote powerful mixing to ensure rapid temperature decay of the hot flow emanating from the holes. This rapid temperature decay prevents thermal damage to downstream structures 40 that may be made from low temperature capability materials such as aluminium or carbon reinforced plastic.

Figure 8:
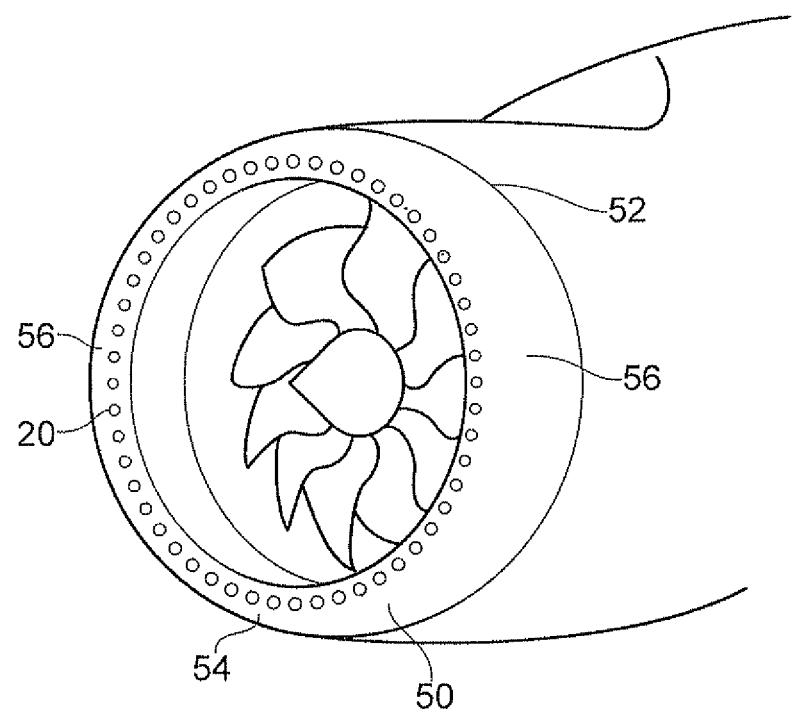
FIG. 8 shows a second example application for a boundary layer energiser according to an example of the present invention.

With reference to FIG. 8, one or more boundary layer energisers 20 may be arranged on an intake 50 of a jet engine 52. The boundary layer energisers may be disposed, at least in part, about the circumference of the intake cowling. In particular, the boundary layer energisers may be disposed on the intake lower lip 54 to reduce incidence separation and the boundary layer energisers may be disposed on the intake lip sides 56 to reduce crosswind separation. Such an arrangement improves intake lip flow stability by preventing intake flow separation thereby protecting the fan from damage. This is particularly important in conditions of cross-wind on the ground and high incidence in flight. This is achieved with lower active flow rates or using lower energy flow supply than the prior art. Applying the boundary layer energisers to the jet engine intake 50 allows a smaller and more efficient intake to be designed thus reducing weight and improving fuel consumption.

Figure 9:
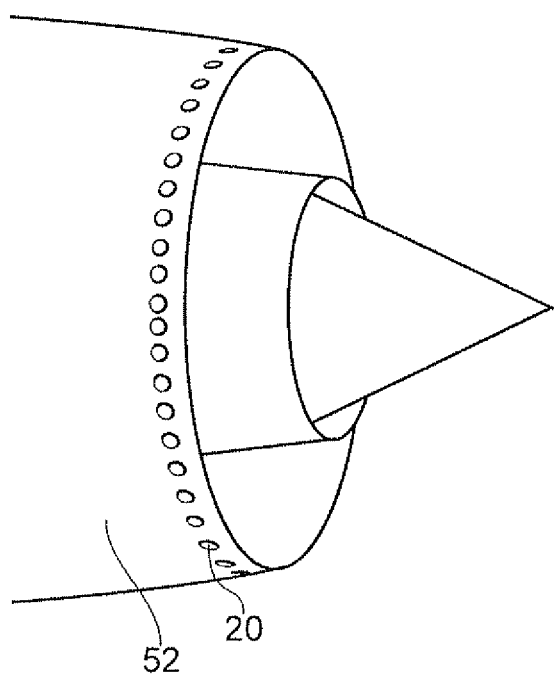
FIG. 9 shows a third example application for a boundary layer energiser according to an example of the present invention.

With reference to FIG. 9, one or more boundary layer energisers 20 may also be arranged on the acoustic lining at the rear of the jet engine 52 external fan cowl to act as 'virtual chevrons'. The boundary layer energisers 20 increase the mixing in the shear layer between the fan stream and the ambient air. This modifies the downstream shock field and turbulent structures within the jet plume with potential benefits for low frequency cabin noise.

Figure 10:
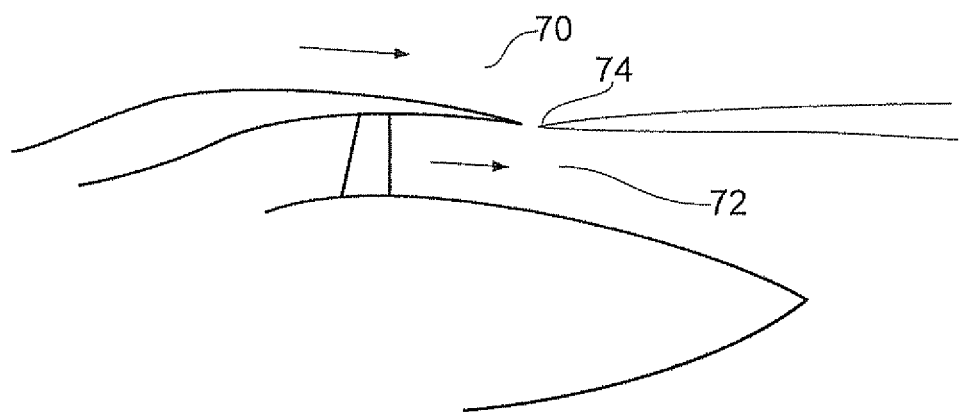
FIG. 10 shows a fourth example application for a boundary layer energiser according to an example of the present invention.
Figure 11:
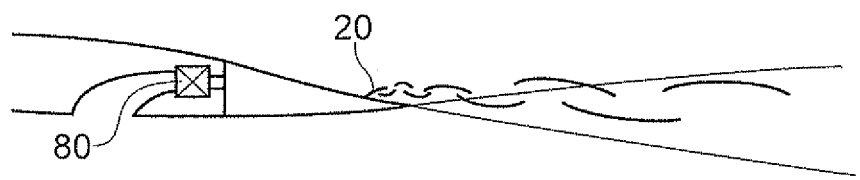
FIG. 11 shows further detail of the fourth example application for a boundary layer energiser according to an example of the present invention.

With reference to FIG. 10, the boundary layer energisers 20 may be used on the core nozzle assembly of a bypass jet engine to promote increased mixing between fan streams 70 and core streams 72. This will beneficially modify the shear layer 74 to reduce far-field community noise. Furthermore, with reference to FIG. 11 the boundary layer energiser 20 need not be permanently active and may be selectively activated by virtue of a valve 80. Selectively activating the boundary layer energisers reduces aerodynamic performance losses associated with their operation and offer a significant benefit over current intrusive fixed structure nozzle treatments. The boundary layer energiser may also be supplied directly with fan stream air or ram inlet, as by nature the boundary layer energisers have a low intake pressure requirement. This eliminates the need for a separate flow source, for example a compressor bleed, and minimises the associated high performance penalties.

Figure 12:
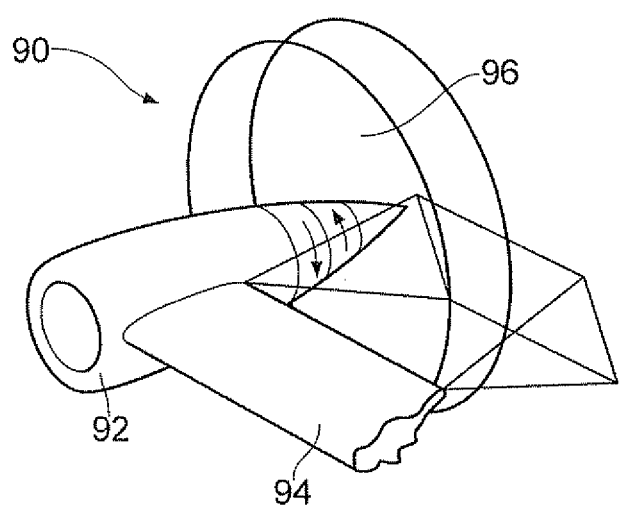
FIG. 12 shows a fifth example application for a boundary layer energiser according to an example of the present invention.
Figure 13A:
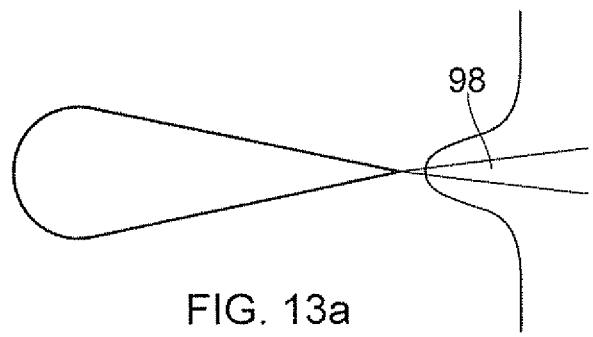
FIG. 13 shows a sixth example application for a boundary layer energiser according to an example of the present invention.
Figure 13B:
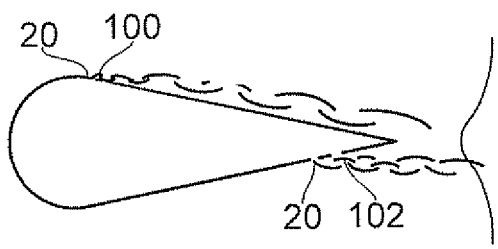

With reference to FIGS. 12 and 13, the boundary layer energisers 20 of the present invention may be used for a pusher prop-fan configuration 90 where the engine 92 is supported by a pylon 94 ahead of the rotor 96. The pylon wake 98 will cause a low energy perturbation to interact with the rotor. This pressure non-uniformity generates increased noise and blade stress. The nature and region of this interaction is shown in FIG. 13(a). The boundary layer energiser 20 can be used in two ways to minimise the pylon wake disturbance that the fan rotor will experience. As shown in FIG. 13(b), the introduction of boundary layer energisers at the pylon leading edge 100 promotes mixing of higher energy free-stream flow into the surface boundary layer which promotes rapid decay in the pylon generated wake. In addition the application of boundary layer energisers at the trailing edge 102 can be used to reduce the pylon chord by the application of a bluffer pylon body, allowing increased spacing to the fan rotor.

Figure 14:
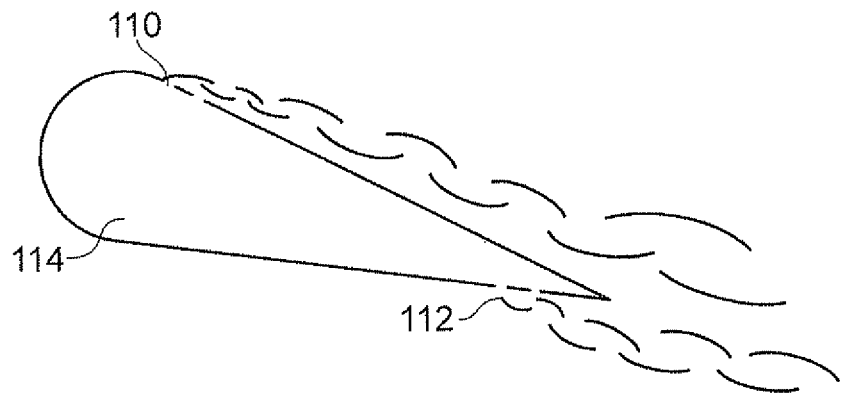
FIG. 14 shows an seventh example application for a boundary layer energiser according to an example of the present invention.
Figure 15A:
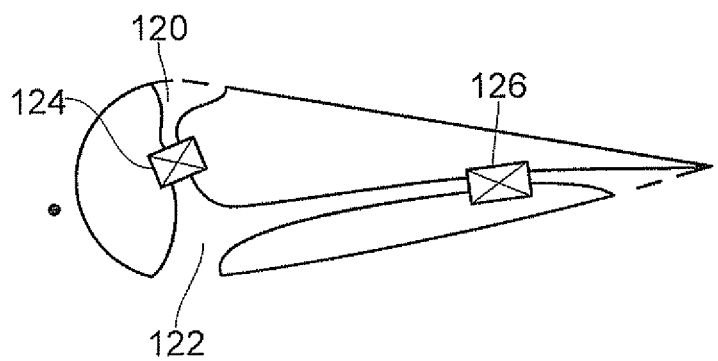
FIG. 15 shows further detail of the seventh example application for a boundary layer energiser according to an example of the present invention.
Figure 15B:
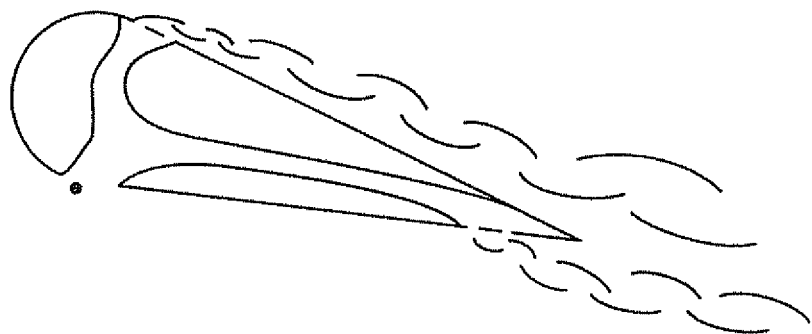

With reference to FIG. 14, boundary layer energisers may be applied to the leading edge 110 and trailing edge 112 of an aerofoil body 114 in order to increase lift at incidence. The leading edge 110 boundary layer energisers would act to delay flow separation, while the trailing edge 112 boundary layer energisers would generate a 'blown flap' effect, effectively increasing the aerofoil chord and camber. As shown in FIG. 15, such a system could be fed via either surface flush inlets 120 or, in the case of the trailing edge boundary layer energisers, via slotted inlets 122 on the lower leading edge positioned to coincide with the body stagnation point. The boundary layer energisers may be selectively activated by virtue of valves 124, 126 (as shown in FIG. 15(a)) or may be permanently activated (as shown in FIG. 15(b)). This system is advantageous over current aerodynamic devices as it would not require high pressure bleed air.

The invention claimed is:

1. A boundary layer energiser for energising a boundary layer flow over a surface, the boundary layer energiser comprising:
   a plurality of passages, each passage terminating in a respective hole provided on the surface, the holes being arranged in a cluster on the surface, wherein
   the cluster of holes comprises three or more holes arranged on the surface such that each hole is at the vertex of a first polygon,
   the plurality of passages are angled with respect to one another at the surface such that, when in use, a helical vortex is formed by a fluid flowing through the plurality of passages, and
   each of the plurality of passages has a direction vector along which the passage extends to terminate at the respective hole, the direction vectors of the plurality of passages being angled relative to one another such that a direction vector of each passage passes over a hole of a neighboring passage of the plurality of passages.

2. A boundary layer energiser as claimed in claim 1, wherein
   the first polygon comprises between three and ten vertices.

3. A boundary layer energiser as claimed in claim 1, wherein
   the boundary layer energiser comprises a plurality of clusters, each with a plurality of passages and respective holes arranged on the surface, wherein a centre of each cluster is arranged on the surface at the vertex of a second polygon.

4. A boundary layer energiser as claimed in claim 3, wherein
   the second polygon is a hexagon.

5. A boundary layer energiser as claimed in claim 3, wherein
   the passages are arranged such that neighbouring clusters generate a vortex in opposite directions to one another.

6. A boundary layer energiser as claimed in claim 1, wherein
   the boundary layer energiser comprises a plurality of clusters, each with a plurality of passages and respective holes arranged on the surface, wherein a centre of each cluster is arranged on the surface in a linear arrangement.

7. A boundary layer energiser as claimed in claim 1, wherein
   the directions of each passage at the surface has a vector component parallel to the surface.

8. A boundary layer energiser as claimed in claim 7, wherein
the vector defined by the sum of the directions of the plurality of passages at the surface is perpendicular to the surface.

9. A boundary layer energiser as claimed in claim 7, wherein
the vector defined by the sum of the directions of the plurality of passages at the surface has a component parallel to the surface.

10. A boundary layer energiser as claimed in claim 1, wherein
the flow is provided by a flow source.

11. A boundary layer energiser as claimed in claim 1, wherein
the flow is provided from an opening in a second surface.

12. A turbomachine comprising a boundary layer energiser as claimed in claim 1.

13. A gas turbine comprising a boundary layer energiser as claimed in claim 1.

14. A boundary layer energiser as claimed in claim 1, wherein
the plurality of passages are angled with respect to the surface such that at least two of the passages are disposed at different angles to the surface.

15. A boundary layer energiser as claimed in claim 1, wherein
the holes are arranged in a plurality of clusters, and neighboring clusters generate vortices that rotate in opposite directions.

16. A method of energising a boundary layer flowing over a surface, the method comprising:
providing a plurality of passages, each passage terminating in a respective hole provided on the surface, the holes being arranged in a cluster on the surface, wherein the plurality of passages are angled with respect to one another at the surface;
allowing a fluid to flow through the plurality of passages; and
forming a helical vortex with the fluid by virtue of the angles between the passages,
the providing of the plurality of passages is such that each of the plurality of passages has a direction vector along which the passage extends to terminate at the respective hole, the direction vectors of the plurality of passages being angled relative to one another such that a direction vector of each passage passes over a hole of a neighboring passage of the plurality of passages.

17. The method of energising a boundary layer flowing over a surface as claimed in claim 16, wherein
the plurality of passages are angled with respect to the surface such that at least two of the passages are disposed at different angles to the surface.

18. The method of energising a boundary layer flowing over a surface as claimed in claim 16, wherein
the holes are arranged in a plurality of clusters, and neighboring clusters generate vortices that rotate in opposite directions.

* * * * *